United States Patent
Ohara et al.

(10) Patent No.: US 7,973,820 B2
(45) Date of Patent: Jul. 5, 2011

(54) MOTION DETECTOR AND IMAGE CAPTURE DEVICE, INTERCHANGEABLE LENS AND CAMERA SYSTEM INCLUDING THE MOTION DETECTOR

(75) Inventors: Masamichi Ohara, Osaka (JP); Yosuke Yamane, Osaka (JP); Yoshiyuki Kishimoto, Nara (JP)

(73) Assignee: Panasonic Corporation, Osaka (JP)

( * ) Notice: Subject to any disclaimer, the term of this patent is extended or adjusted under 35 U.S.C. 154(b) by 674 days.

(21) Appl. No.: 12/121,142

(22) Filed: May 15, 2008

(65) Prior Publication Data

US 2009/0309983 A1 Dec. 17, 2009

(30) Foreign Application Priority Data

May 17, 2007 (JP) ................................ 2007-131177

(51) Int. Cl.
*H04N 5/228* (2006.01)
(52) U.S. Cl. ................................ 348/208.3; 348/208.99
(58) Field of Classification Search ............ 348/208.99, 348/208.2, 208.3, 208.14, 208.16; 386/242
See application file for complete search history.

(56) References Cited

U.S. PATENT DOCUMENTS

| | | | |
|---|---|---|---|
| 4,713,697 A | | 12/1987 | Gotou et al. |
| 5,805,212 A | * | 9/1998 | Fujiwara .................... 348/208.8 |
| 5,959,666 A | * | 9/1999 | Naganuma .................. 348/208.3 |
| 5,986,698 A | * | 11/1999 | Nobuoka .................... 348/208.3 |
| 6,128,442 A | | 10/2000 | Enomoto |
| 6,982,746 B1 | * | 1/2006 | Kawahara ................ 348/208.99 |
| 7,292,270 B2 | * | 11/2007 | Higurashi et al. ......... 348/208.3 |
| 7,668,447 B2 | * | 2/2010 | Yamazaki ....................... 396/55 |

FOREIGN PATENT DOCUMENTS

| | | |
|---|---|---|
| JP | 61-255175 | 11/1986 |
| JP | 2000-56350 A | 2/2000 |
| JP | 2002-99013 | 4/2002 |
| JP | 2006-003645 | 1/2006 |
| JP | 2007-163687 | 6/2007 |

* cited by examiner

*Primary Examiner* — Justin P Misleh
(74) *Attorney, Agent, or Firm* — Renner, Otto, Boisselle & Sklar, LLP

(57) ABSTRACT

The blurring caused by a tiny tremor movement is eliminated, which almost perfectly without being affected by intentional camera movement by distinguishing the unintentional tremor movement from other movements (or disturbances). A motion detector includes: a motion detecting section for detecting a movement of an image capture device and outputting a detection signal, of which the amplitude and frequency represent the movement; a motion signal generating section for generating a motion signal representing a physical quantity corresponding to the magnitude of the movement based on the detection signal; a notification signal generating section for generating a notification signal that marks start and end of a movement of the image capture device, which is a non-tremor movement, based on the detection signal that has been output; and a control section for controlling the motion signal generating section by reference to the notification signal such that an output of the motion signal is fixed at a predetermined one from the start through the end of the non-tremor movement.

19 Claims, 12 Drawing Sheets

MOTION DETECTOR AND IMAGE CAPTURE DEVICE, INTERCHANGEABLE LENS AND CAMERA SYSTEM INCLUDING THE MOTION DETECTOR

BACKGROUND OF THE INVENTION

1. Field of the Invention

The present invention relates to a motion detector for sensing a tremor movement produced by shooter's hand tremors, and also relates to an image capture device, an interchangeable lens and a camera system including such a motion detector.

2. Description of the Related Art

It is known that an image capture device will move due to a shooter's involuntary hand tremors and will also move when he or she intentionally changes the compositions for the purpose of panning the camera or panning shot, for example. To sense the movement of the former type (which is often called a "tremor movement"), an image stabilizer for detecting the tremor movement produced by shooter's unintentional hand tremors and an image capture device including such an image stabilizer have already been built in actual products.

However, an image capture device with such an image stabilizer will also sense and process the camera movement that has been intentionally produced by the shooter to change compositions for the purpose of panning the camera or panning shot, for example, as a kind of a tremor movement, thus sometimes making the shooter feel uncomfortable right after he or she has changed the compositions. More specifically, an image capture device senses relatively slight camera movement due to the shooter's hand tremors by amplifying them, and then uses it to stabilize the image. The magnitude of a movement produced to change the compositions is much greater than that of the tiny tremor movement. Nevertheless, the image capture device also attempts to process that movement by amplifying it. As a result, right after the change of compositions is done, the electric circuit for use to stabilize the image is too saturated to start eliminating the blurring caused by the tiny tremor movement immediately.

An image stabilizer designed to overcome such a problem is disclosed in Japanese Patent Application Laid-Open Publication No. 2002-99013. The image stabilizer includes means for extracting DC components from a motion detection signal and a memory to record the history of past DC components, and senses the start and end of change of compositions based on the difference between the motion detection signal and the DC components. If the DC components that were extracted when the compositions started to be changed are used when the change of compositions is done, the tremor movement can also be detected precisely enough even right after the compositions have been changed.

According to the technique disclosed in that patent document, however, the means for extracting DC components from a motion detection signal and the memory to record the history of past DC components are required. Addition of these pieces of extra hardware, however, would not just increase the manufacturing cost of a camera but also hinder reducing the size and weight or lowering the power dissipation thereof. That is why there is a growing demand for an image stabilizer that does not need any of those additional pieces of hardware.

SUMMARY OF THE INVENTION

In order to overcome the problems described above, the present invention has an object of providing a motion detector that can eliminate the blurring caused by a tiny tremor movement almost perfectly without being affected by intentional camera movement by distinguishing the unintentional tremor movement from other movements (or disturbances) and that does not require the means for extracting DC components from a motion detection signal or the memory to record the history of past DC components.

A motion detector according to the present invention includes: a motion detecting section for detecting a movement of an image capture device and outputting a detection signal, of which the amplitude and frequency represent the movement; a motion signal generating section for generating a motion signal representing a physical quantity corresponding to the magnitude of the movement based on the detection signal; a notification signal generating section for generating a notification signal that marks start and end of a movement of the image capture device, which is a non-tremor movement, based on the detection signal that has been output; and a control section for controlling the motion signal generating section by reference to the notification signal such that an output level of the motion signal is fixed at a predetermined one from the start through the end of the non-tremor movement.

The motion signal generating section may include an analog circuit and a digital circuit.

The digital circuit of the motion signal generating section may include an integrator, and wherein the integrator may integrate the detection signal that has been processed by the analog and digital circuits, thereby generating the motion signal representing the physical quantity corresponding to the magnitude of the movement.

The notification signal generating section may detect, as a variation point of the notification signal, a point where a waveform of the notification signal changes in an impulse form.

The control section may store first and second threshold values that have been defined in advance, and when the notification signal passes through the first threshold value, the control section may sense that the non-tremor movement has started, and wherein when the notification signal passes through the second threshold value after the start of the non-tremor movement has been sensed, the control section may sense that the non-tremor movement has ended.

The control section may store a predefined threshold value, and when the notification signal passes through the threshold value, the control section may sense that the non-tremor movement has started, and wherein when the notification signal stays within a predetermined amplitude range for a predetermined amount of time, the control section may sense that the non-tremor movement has ended.

The control section may control the motion signal generating section so as to fix the detection signal at a predetermined level before the motion signal generating section integrates the detection signal.

The control section may control the motion signal generating section such that the analog circuit of the motion signal generating section fix the detection signal at the predetermined level.

The control section may control the motion signal generating section such that the digital circuit of the motion signal generating section fix the detection signal at the predetermined level.

The control section may control the motion signal generating section such that both the analog and digital circuits of the motion signal generating section fix the detection signal at the predetermined level.

The control section may control the motion signal generating section such that the detection signal is unfixed from the predetermined level in the vicinity of a zero-cross point of the detection signal.

The notification signal generating section may generate the notification signal that marks the start and end of the non-tremor movement of the image capture device based on frequency of the detection signal.

An image capture device includes an imager and an optical system to form an image of a subject, the device further includes: a motion detecting section for detecting a movement of the image capture device and outputting a detection signal, of which the amplitude and frequency represent the movement; a motion signal generating section for generating a motion signal representing a physical quantity corresponding to the magnitude of the movement based on the detection signal; a notification signal generating section for generating a notification signal that marks start and end of a movement of the image capture device, which is a non-tremor movement, based on the detection signal that has been output; and a control section for controlling the motion signal generating section by reference to the notification signal such that an output level of the motion signal is fixed at a predetermined one from the start through the end of the non-tremor movement.

The optical system may include an image stabilizer lens, of which the positions are changed in response to a drive signal, and the image capture device may further include a lens driver that shifts the image stabilizer lens in response to the motion signal, and wherein the lens driver shifts an optical axis of the image stabilizer lens such that an optical axis of the optical system is aligned, and then kept aligned, with that of the imager in accordance with the motion signal.

The image capture device further includes a driver for shifting the imager in response to the motion signal, wherein the driver may shift the imager in response to the motion signal such that the image of the subject that has been incident on the imager from the optical system does not move but stays at a predetermined location on the imager.

An image capture device with an imager includes: an optical system to form an image of a subject by collecting light from the subject; a driver for driving a part or all of the optical system within a plane that is perpendicular to an optical axis of the optical system; a motion detecting section for detecting a movement of the image capture device and outputting a motion signal representing a detection result; and a processor for stabilizing the image of the subject due to the movement of the image capture device. The processor has: a first control mode for controlling, based on the motion signal that has been output, the driver which drives a part or all of the optical system; and a second control mode for controlling the driver not based on the motion signal. The processor selects one of the first control mode and second control mode by reference to the motion signal and controls the driver in the selected control mode.

The image capture device has an optical system to form an image of a subject by collecting light from the subject and an imager for imaging the image of the subject. The device includes: a driver for driving the imager within a plane that is perpendicular to an optical axis of the optical system; a motion detecting section for detecting a movement of the image capture device and outputting a motion signal representing a detection result; and a processor for stabilizing the image of the subject due to the movement of the image capture device. The processor has: a first control mode for controlling, based on the motion signal that has been output, the driver which drives the imager; and a second control mode for controlling the driver not based on the motion signal. The processor selects one of the first control mode and second control mode by reference to the motion signal and controls the driver in the selected control mode.

An interchangeable lens for use in an image capture device, of which the lens is replaceable with the interchangeable lens. The interchangeable lens includes: an optical system to form an image of a subject; a motion detecting section for detecting a movement of the interchangeable lens and outputting a detection signal, of which the amplitude and frequency represent the movement; a motion signal generating section for generating a motion signal representing a physical quantity corresponding to the magnitude of the movement based on the detection signal; a notification signal generating section for generating a notification signal that marks start and end of a movement of the interchangeable lens, which is a non-tremor movement, based on the detection signal that has been output; and a control section for controlling the motion signal generating section by reference to the notification signal such that an output level of the motion signal is fixed at a predetermined one from the start through the end of the non-tremor movement.

A camera system includes an interchangeable lens and a camera body. The interchangeable lens includes: a motion detecting section for detecting a movement of the interchangeable lens and outputting a detection signal, of which the amplitude and frequency represent the movement; and a first communication section. The camera body includes: a second communication section to be connected to the first communication section; and a signal processor for receiving a detection signal through the first and second communication sections and generating a motion signal representing a physical quantity corresponding to the magnitude of the movement based on the detection signal. The signal processor includes: a notification signal generating section for generating a notification signal that marks start and end of a movement of the camera body, which is a non-tremor movement, based on the frequency of the detection signal; and a control section for controlling the motion signal generating section by reference to the notification signal such that an output level of the motion signal is fixed at a predetermined one from the start through the end of the non-tremor movement.

According to the present invention, a control section controls a motion signal generating section by reference to a notification signal such that the output level of a motion signal is fixed at a predetermined one from the start through the end of a non-tremor movement. As a result, the blurring caused by a tiny tremor movement can be eliminated almost perfectly without being affected by non-tremor disturbances produced intentionally by the shooter.

In addition, according to the present invention, a notification signal that marks the start and end of the non-tremor movement of the image capture device is generated based on the frequency of a detection signal that is output to represent the movement of the image capture device. According to the present invention, no means for extracting DC components from a detection signal or no memory to record the history of past DC components is needed anymore, thus cutting down the cost.

Figure 2:
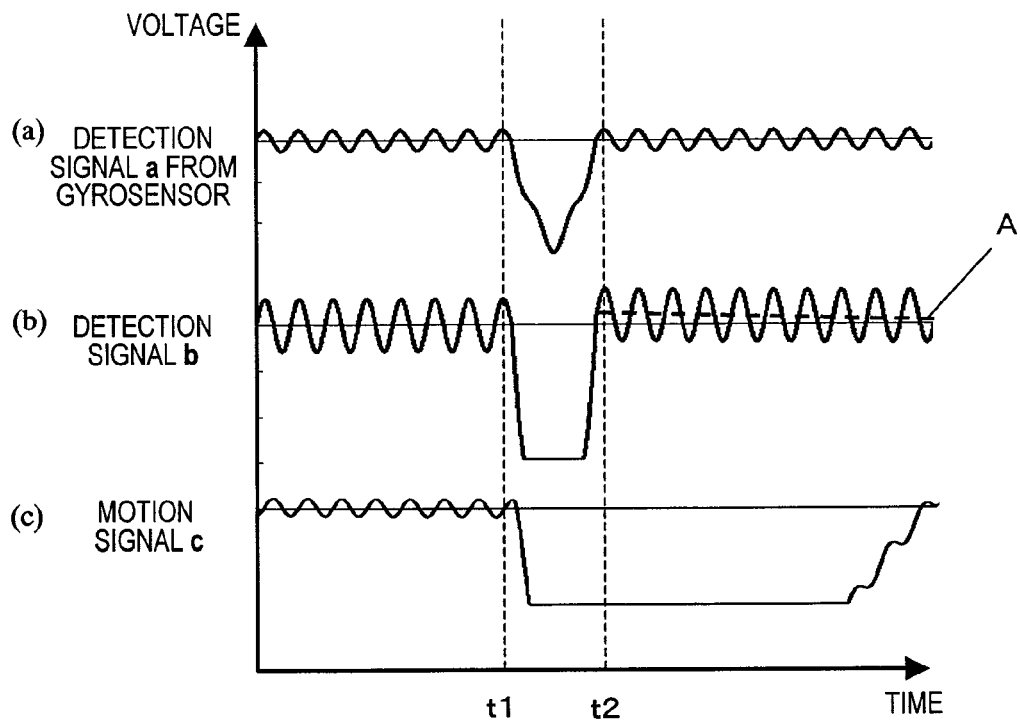

(*a*) to (*c*) of FIG. 2 are waveform diagrams showing the waveforms of respective signals for use in the motion detecting and motion signal generating sections.

Figure 3:
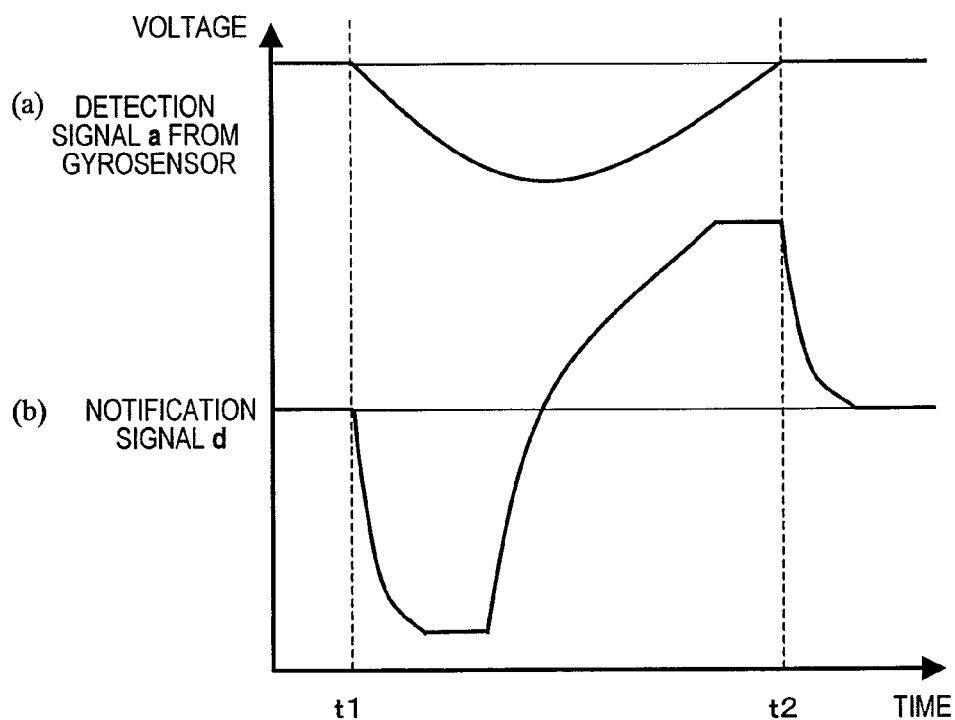

(a) and (b) of FIG. 3 are waveform diagrams showing the waveforms of respective signals for use in this notification signal generating section 4.

Figure 4:
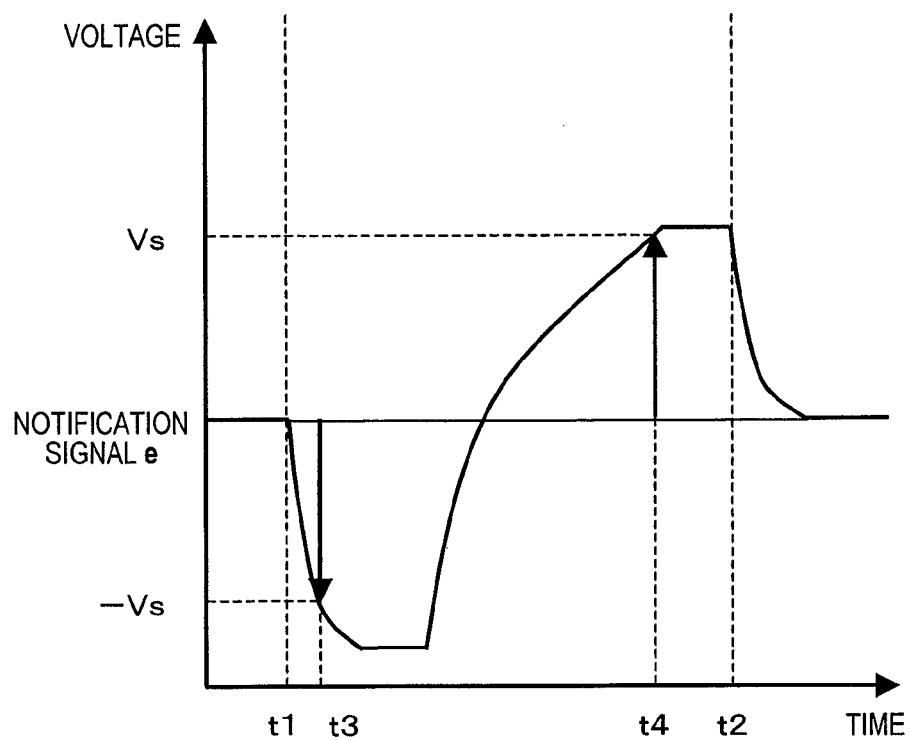

FIG. 4 is a waveform diagram showing the waveform of a notification signal e.

Figure 5:
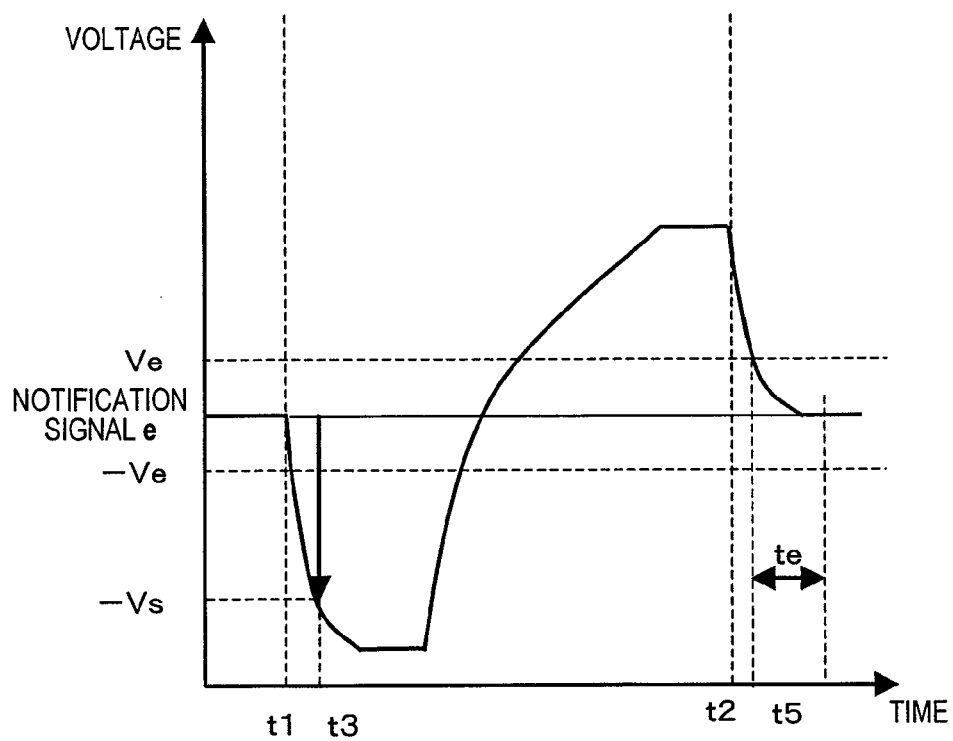

FIG. 5 is a waveform diagram showing the waveform of another notification signal e.

Figure 6:
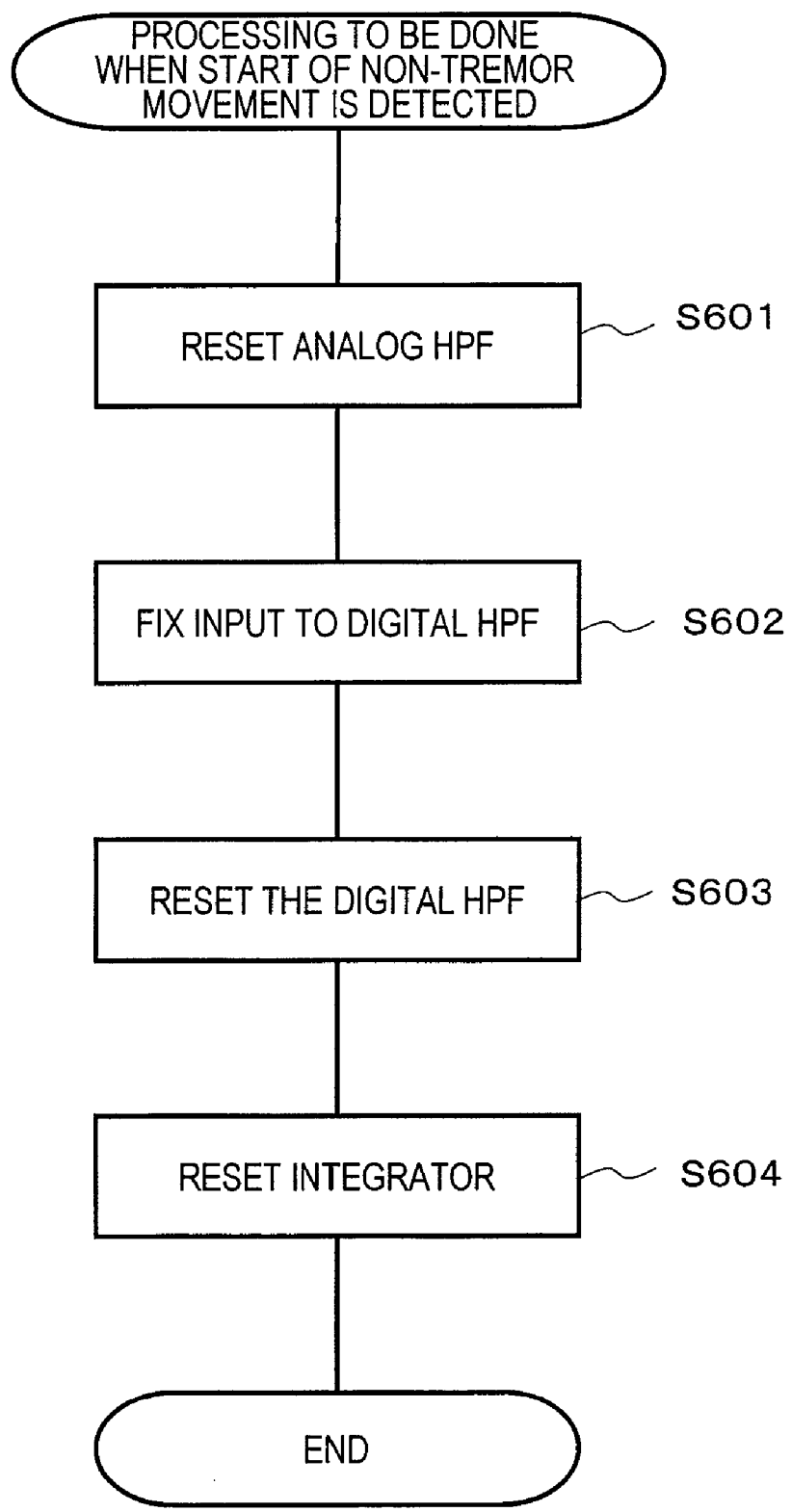

FIG. 6 is a flowchart showing the procedure of the processing to be done when the start of a non-tremor movement is detected.

Figure 7:
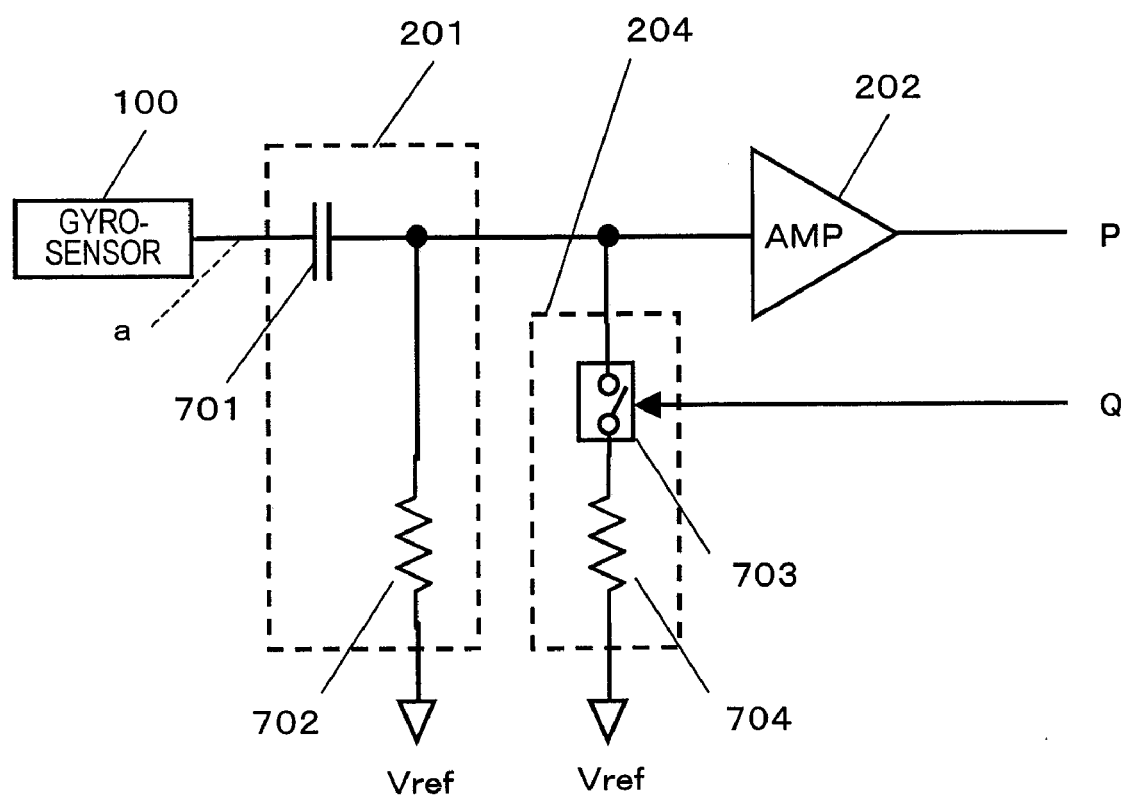

FIG. 7 is a simplified circuit diagram illustrating an analog HPF resetting processing step S601.

Figure 8:
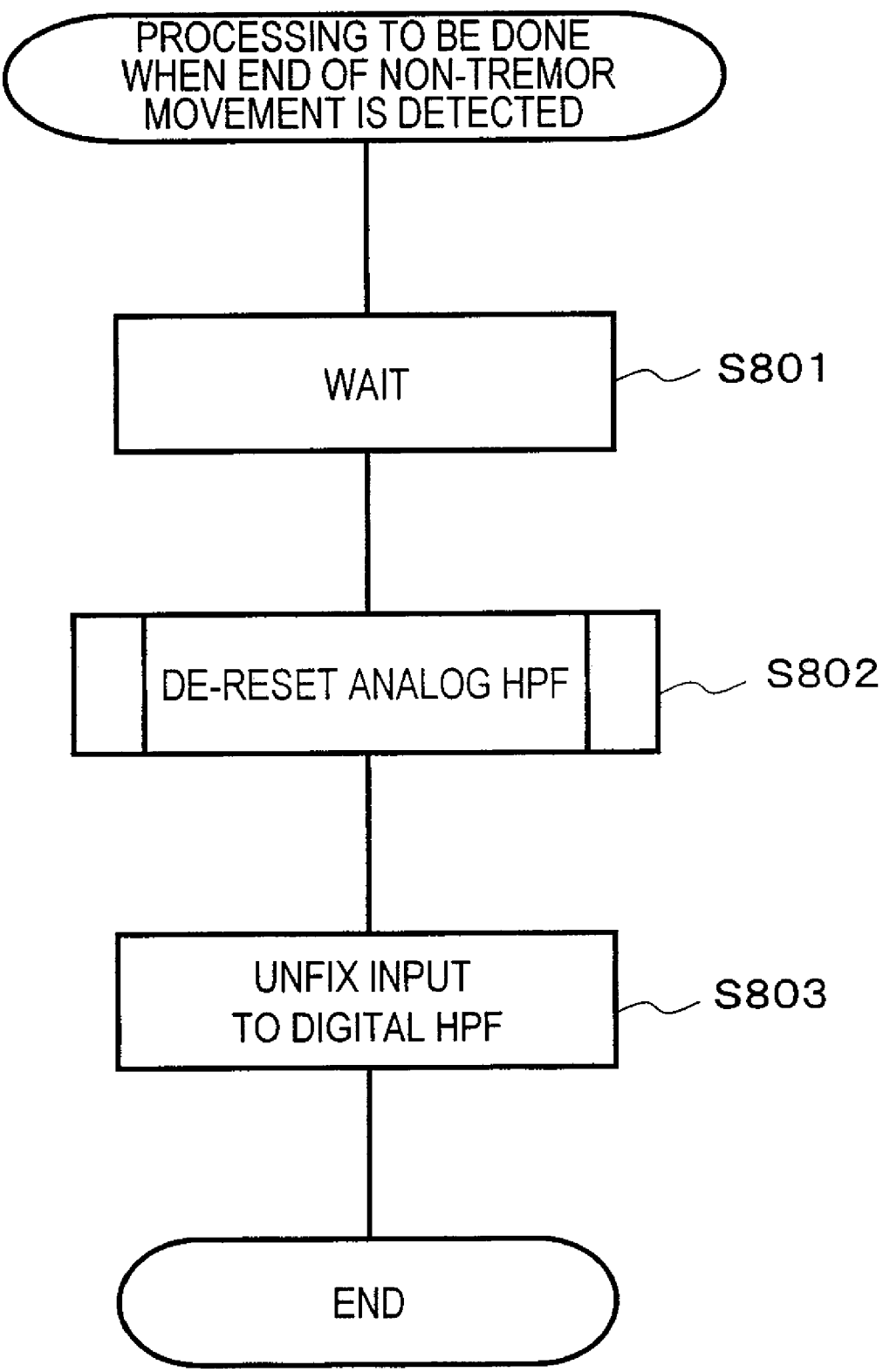

FIG. 8 is a flowchart showing the procedure of the processing to be done when the end of the non-tremor movement is detected.

Figure 9:
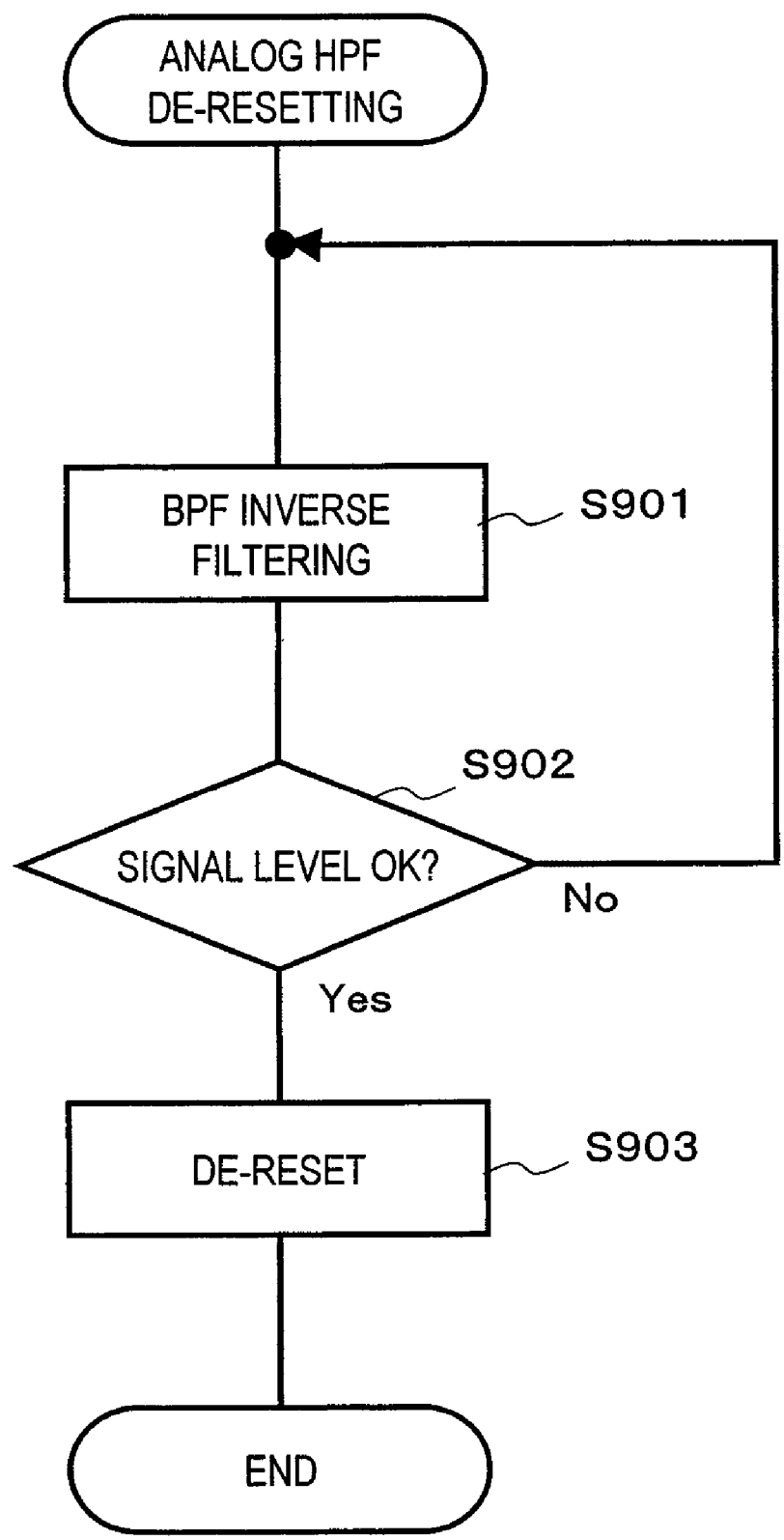

FIG. 9 is a flowchart showing the procedure of an analog HPF de-resetting processing step S802.

Figure 10:
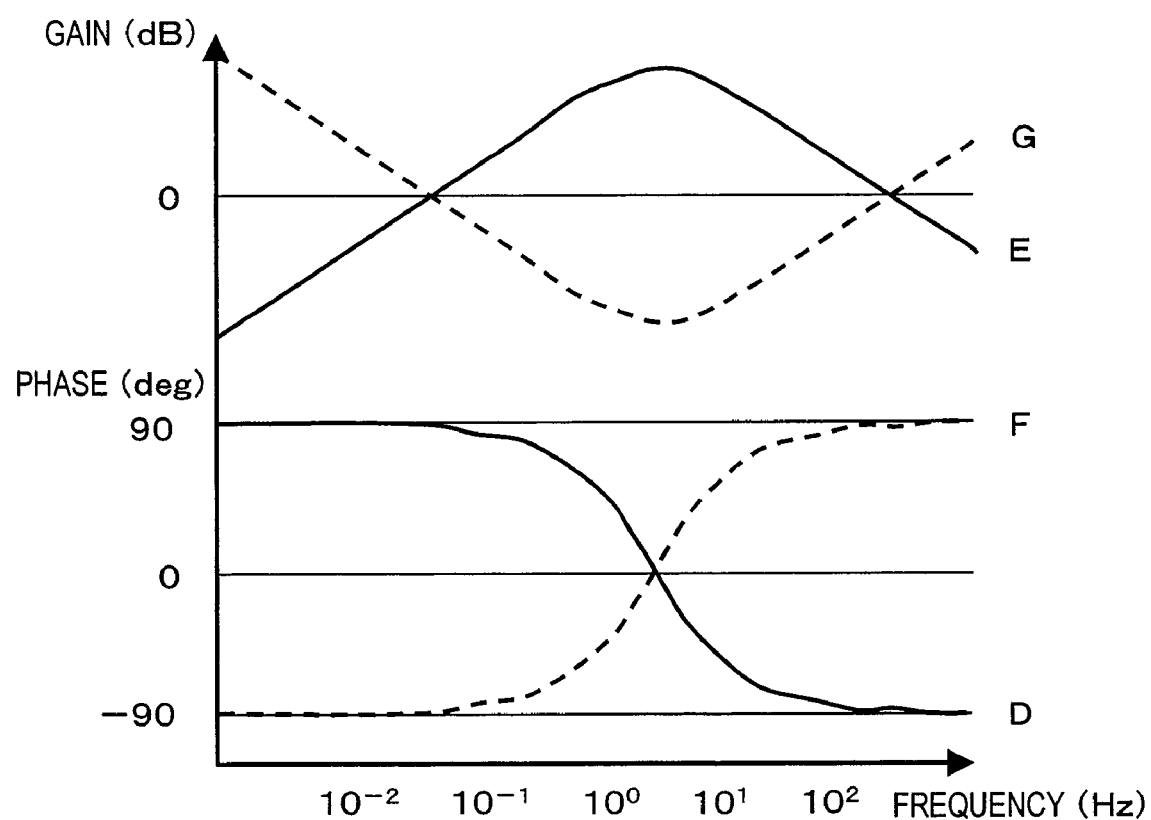

FIG. 10 is a bode diagram showing the characteristic of the BPF 205.

Figure 11:
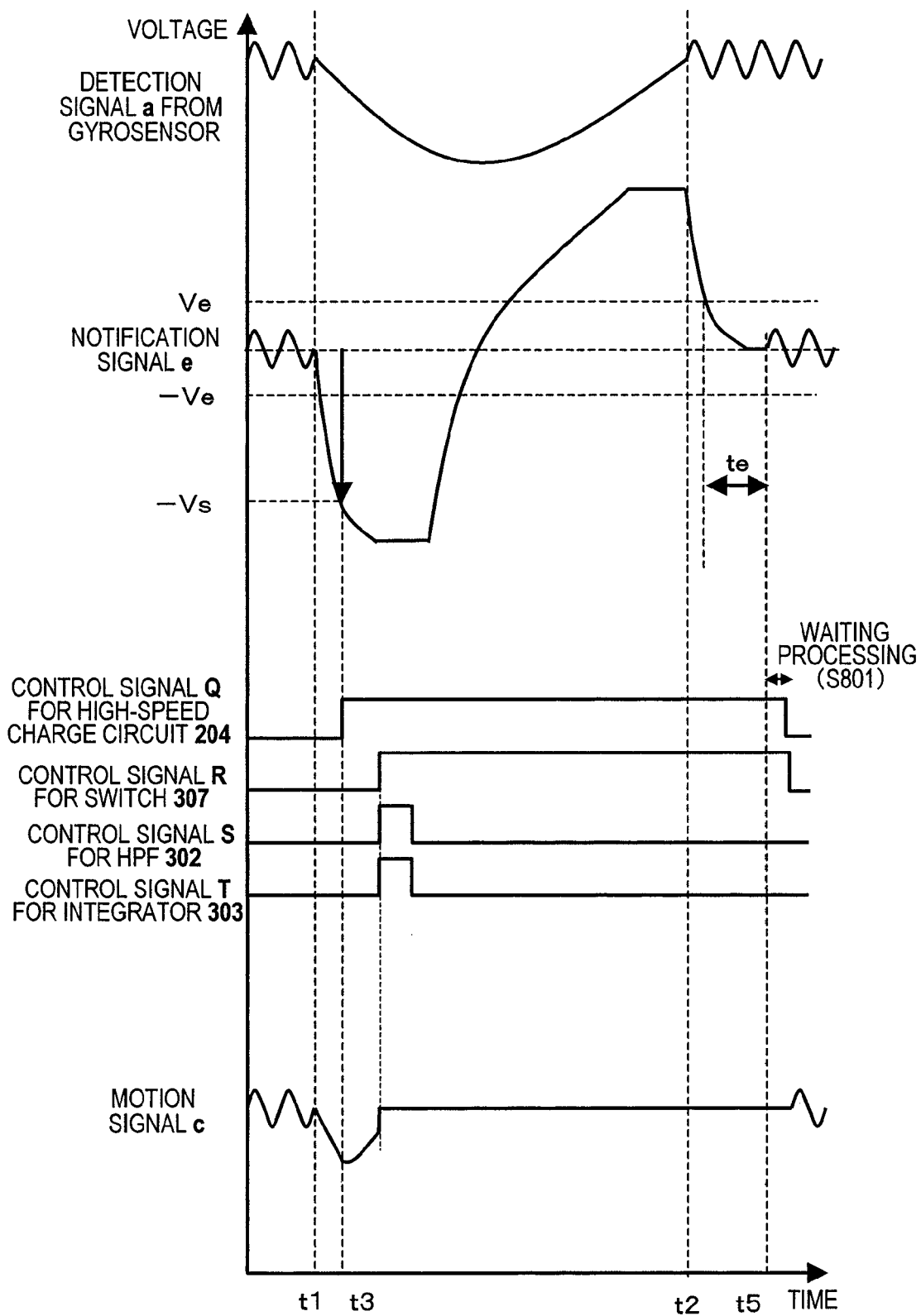

FIG. 11 is a waveform diagram showing the waveforms of various signals for use in respective circuit sections of the motion detector 1.

Figure 12:
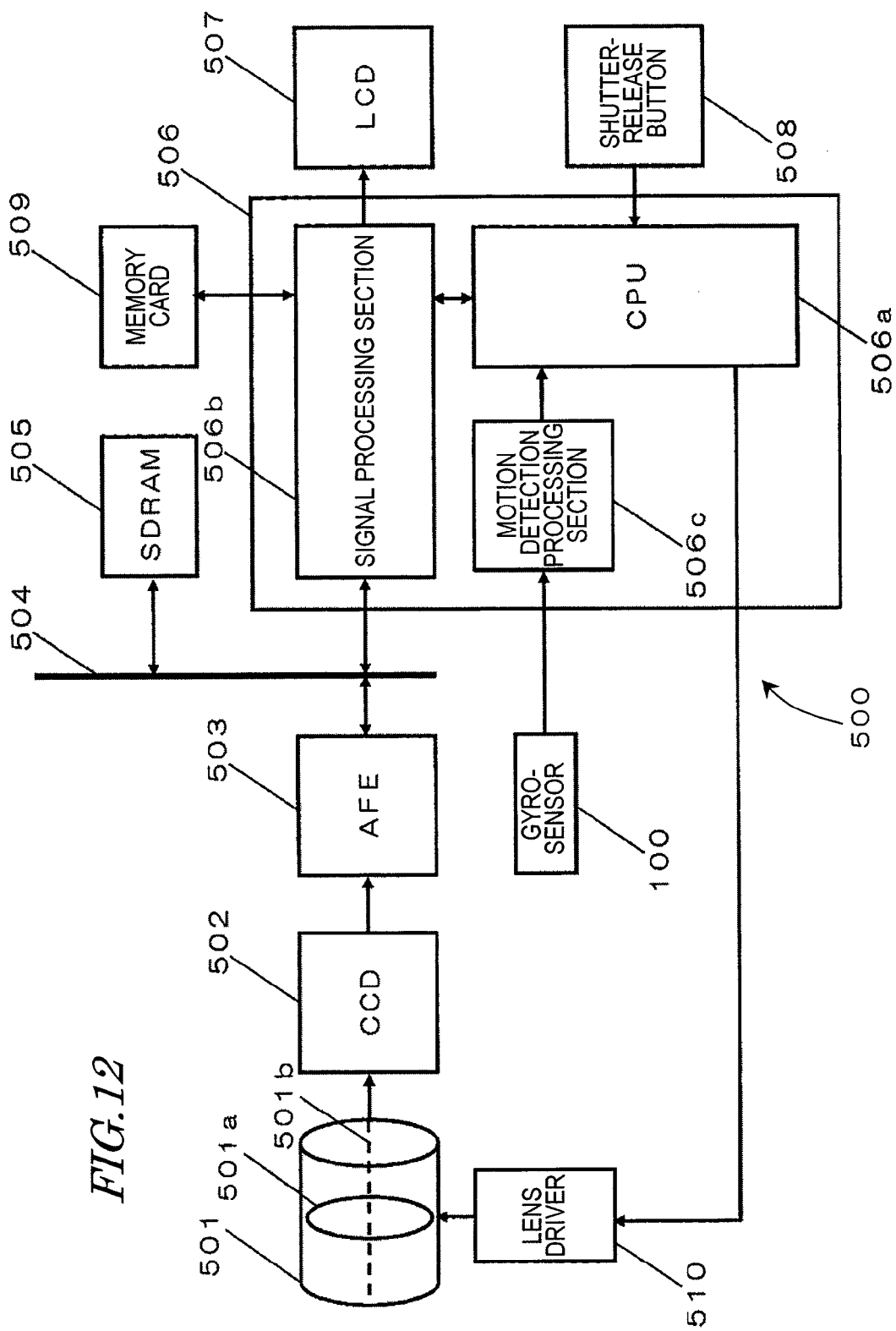

FIG. 12 is a block diagram illustrating a configuration for a digital camera 500 as a second preferred embodiment.

Figure 13:
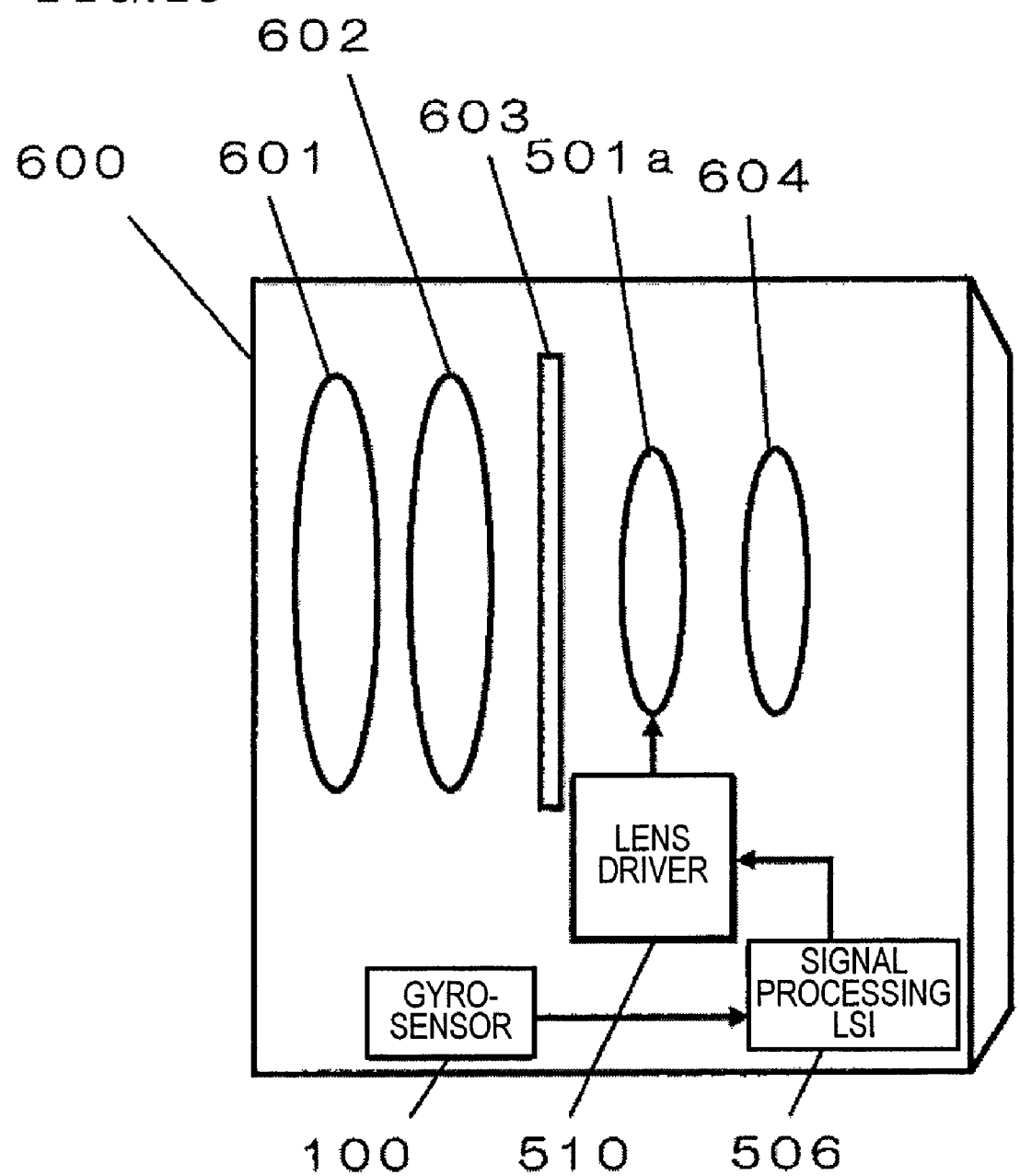

FIG. 13 is a schematic representation illustrating an interchangeable lens 600 as a third preferred embodiment.

Figure 14:
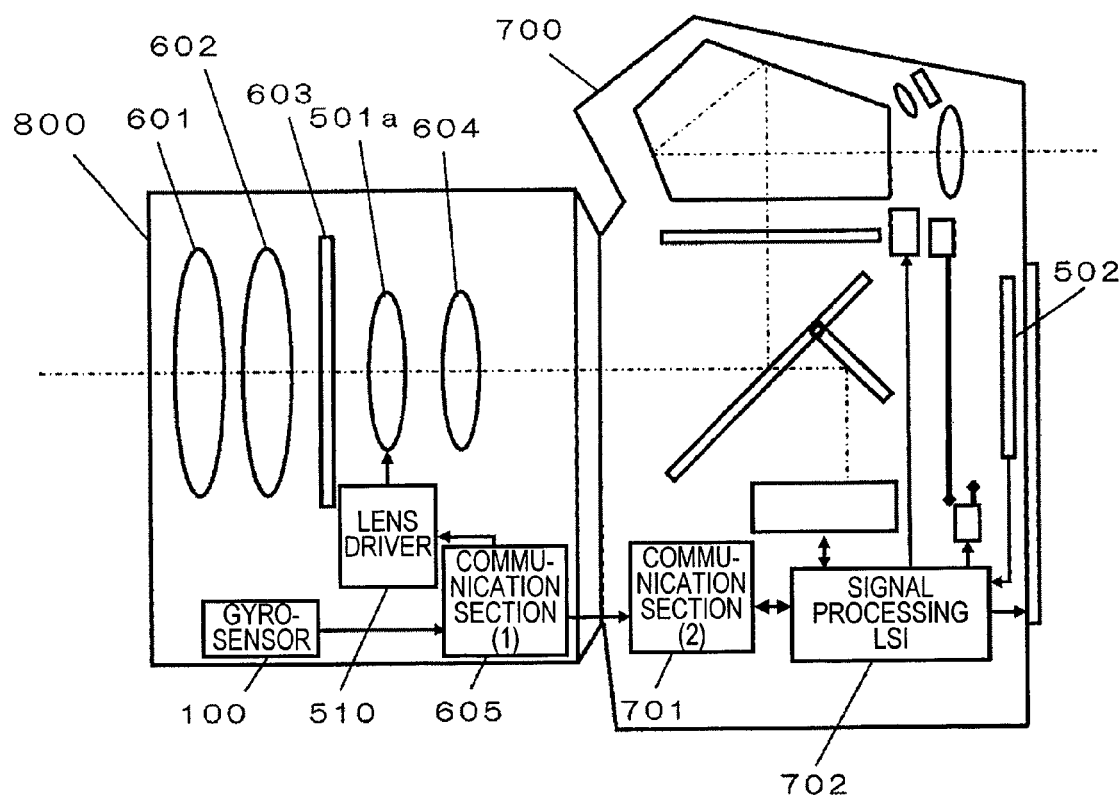

FIG. 14 is a schematic representation illustrating a camera system as a fourth preferred embodiment.

DETAILED DESCRIPTION OF PREFERRED EMBODIMENTS

Hereinafter, preferred embodiments of a motion detector and a device with the same function of said motion detector according to the present invention will be described with reference to the accompanying drawings.

Embodiment 1

Figure 1:
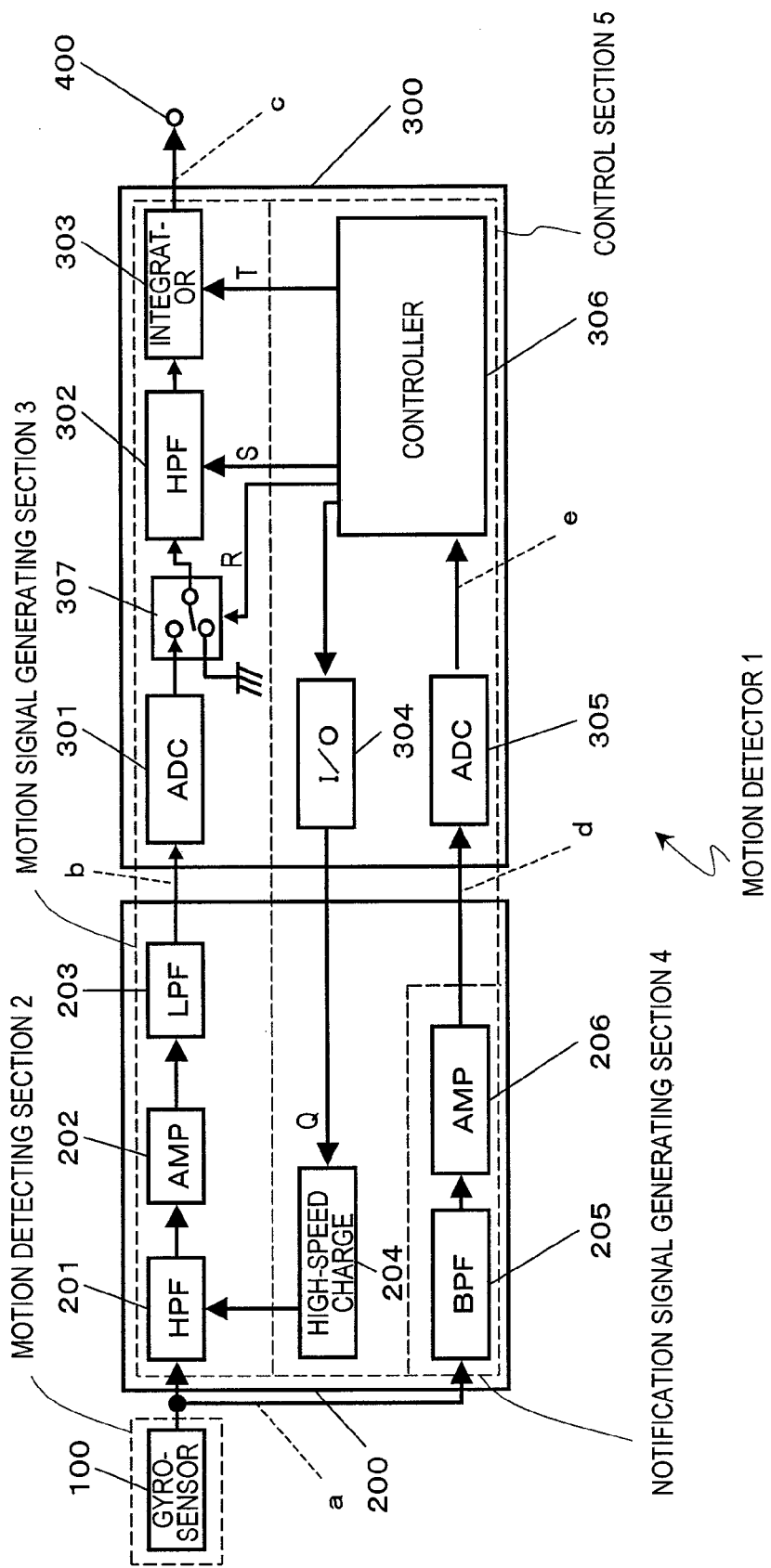
FIG. 1 is a block diagram illustrating a configuration for a motion detector 1 as a first preferred embodiment.

FIG. 1 is a block diagram illustrating a configuration for a motion detector 1 as a preferred embodiment.

The motion detector 1 includes a motion detecting section 2, a motion signal generating section 3, a notification signal generating section 4 and a control section 5. These sections represent respective functional blocks of the motion detector 1. Pieces of hardware that form this motion detector 1 include a gyrosensor 100, an analog signal processing LSI 200 and a digital signal processing LSI 300. These pieces of hardware operate as the motion detecting section 2, motion signal generating section 3, notification signal generating section 4 and control section 5.

Hereinafter, the hardware configuration of the motion detector 1 will be described. The processes as will hereinafter be described later corresponds to the operations of the motion detecting section 2 and motion signal generating section 3.

In this preferred embodiment, the gyrosensor 100 is adopted as the motion detecting section 2. The gyrosensor 100 senses the movement of either the motion detector 1 itself or an image capture device (not shown) including the motion detector 1 and outputs a detection signal a. If the gyrosensor 100 senses the movement of the image capture device in the yaw direction and in the pitch direction and outputs a detection signal a as the sum of the movements in these two directions, only one system of functional blocks shown in FIG. 1 will be needed. However, if the gyrosensor 100 is supposed to sense the movement of the image capture device in either the yaw direction or the pitch direction and outputs a detection signal a representing that movement, then another gyrosensor needs to be provided to sense the movement of the image capture device in the other direction and another processing system, which also has the same configuration as the one shown in FIG. 1, should be provided to process the detection signal supplied from that another gyrosensor.

Next, it will be described how the analog signal processing LSI 200 processes the detection signal a.

The detection signal a is output from the gyrosensor 100 to a high-pass filter (HPF) 201 and a band-pass filter (BPF) 205 in the analog signal processing LSI 200.

The detection signal a, output from the gyrosensor 100 to the analog signal processing LSI 200, has its low frequency components cut off by the HPF 201, is amplified by an amplifier (AMP) 202, and then has its high frequency components cut off by the LPF 203.

The detection signal a supplied from the gyrosensor 100 is passed through the HPF 201 because a DC drift should have been caused in the detection signal a due to a temperature variation or some other variation with time. Thus, those low frequency components need to be cut off by the HPF 201. If a gyrosensor with high DC precision is used, then the HPF 201 does not have to be provided.

The signal a that has been passed through the HPF 201 is amplified by the AMP 202 because the amplitude of the detection signal a supplied from the gyrosensor 100 is smaller than the resolution of an A/D converter (ADC) 301 in the digital signal processing LSI 300. The frequencies of the shooter's hands tremors are 20 Hz at most. That is why the high frequency components that would become noise are cut off by the LPF 203. However, if the noise is a negligible one, then the LPF 203 may be omitted.

Unless the detection signal a is input to the AMP 202 after its low frequency components caused by the DC drift have been cut off by the HPF 201, the output of the AMP 202 sometimes could be saturated. For that reason, the AMP 202 is preferably provided as the next stage for the HPF 201. Meanwhile, the LPF 203 may be inserted anywhere.

After having been subjected to such analog signal processing, the detection signal a is passed as a detection signal b to the ADC 301 in the digital signal processing LSI 300.

Next, it will be described how the digital signal processing LSI 300 processes the detection signal b.

The detection signal b supplied to the digital signal processing LSI 300 is digitized by the A/D converter (ADC) 301, has its low frequency components cut off by an HPF 302, and then is integrated by an integrator 303.

The low frequency components of the detection signal b are cut off in advance by the HPF 302 because the lower the frequency of the input signal, the higher the gain of the integrator 303 and the more likely the output of the integrator 303 gets saturated. The integrator 303 converts the analog detection signal a, which is an angular velocity signal supplied from the gyrosensor 100, and the digital detection signal b, which has been obtained by processing the detection signal a after that, into angular signals.

Thereafter, the detection signal b that has been subjected to this digital signal processing is passed as a motion signal c to an output terminal 400.

Next, the waveforms of the detection signals a and b and the motion signal c processed by the motion detecting section 2 and the motion signal generating section 3 will be described.

FIG. 2 is a waveform diagram showing the waveforms of respective signals for use in the motion detecting and motion signal generating sections. In FIG. 2, the abscissa represents the time, and the ordinate represents the voltage. Portion (a), (b) and (c) of FIG. 2 show the waveforms of the detection signal a, detection signal b and motion signal C, respectively. In this example, the shooter is supposed to perform a normal shooting operation before a time t1 and after a time t2 but to change the compositions intentionally for the purpose of panning the camera or panning shot in the period from the time t1 through the time t2.

Through the time t1, small oscillations representing the unintentional tremor movement produced by the shooter's hand tremors are observed in all of these three signals. However, since he or she changes the compositions intentionally for the purpose of panning the camera or panning shot during the period between the times t1 and t2, the detection signal a changes significantly. As the amplitude of the detection signal a has increased, the output of the AMP 202 will be saturated if the detection signal a is amplified. As a result, the detection signal b will get saturated, too. A part of a signal that is over (or under) its dynamic range has a constant value. Since the output of the integrator 303 is saturated, the motion signal c is also saturated. From the time t2 on, however, as the shooter has already changed the compositions intentionally, those small oscillations representing his or her hand tremors are observed again in the detection signal a as in the period before the time t1.

Since the output of the AMP 202 gets saturated during the period between the times t1 and t2, small oscillations representing the shooter's hand tremors are also observed in the detection signal b along with the DC drift indicated by the dashed line A. Meanwhile, it will take a while for the motion signal c to recover the state before the time t1 because the output of the integrator 303 has gotten saturated during the period between the times t1 and t2 and because the detection signal b has the DC drift indicated by the dashed line A.

As can be easily from FIG. 2 and the foregoing description, if the motion detector consisted of only the motion detecting section 2 and the motion signal generating section 3, it would take a while for the motion signal c to recover its original state in a situation where the shooter has changed the compositions intentionally for the purpose of panning the camera or panning shot.

If the cutoff frequency of the HPF 201 is defined to be a relatively high value, then it will take a shorter amount of time for the saturated motion signal c to get back to the original state before the compositions were changed. However, even a signal with frequencies of several hertz, which should be detected as a signal representing an unintentional tremor movement, will have its amplitude decreased or its phase shifted due to the influence of the frequency characteristic of the HPF. As a result, the tremor movement cannot be detected precisely.

An image capture device including this motion detector 1 eliminates blurring caused by tremor movement by shifting stabilizer lens(es) in the optical system or an imager in the opposite direction to compensate the tremor movement sensed by the motion signal c. An interchangeable lens including this motion detector also eliminates blurring caused by tremor movement by shifting image stabilizer lens(es) in the optical system in the opposite direction to compensate the tremor movement sensed by the motion signal c. And a camera system including this motion detector also eliminates blurring caused by tremor movement by shifting either image stabilizer lens(es) in the optical system of the interchangeable lens or an imager in the camera's body in the opposite direction to compensate the tremor movement sensed by the motion signal c. For that reason, if the shooter has changed the compositions intentionally for the purpose of panning the camera or panning shot, he or she may sometimes feel uncomfortable.

Hereinafter, it will be described with reference to FIG. 1 again how the notification signal generating section 4 works. The output detection signal a of the gyrosensor 100 is also supplied to a BPF 205 in the notification signal generating section 4.

The detection signal a has its low and high frequency components cut off by the BPF 205 and then is amplified by an AMP 206. The BPF 205 is used to detect a variation point according to the present invention. However, the BPF 205 may be replaced with a differentiator or an HPF, too.

If the shooter has intentionally changed the compositions for the purpose of panning the camera or panning shot, the frequency components of the detection signal a are lower than the frequencies of the shooter's hand tremors. That is why the high frequency components representing the unintentional tremor movement produced by his or her hand tremors are cut off by the BPF 205.

Next, it will be described with reference to FIG. 3 why the low frequency components of the detection signal a are cut off by the BPF 205. (a) and (b) of FIG. 3 is a waveform diagram showing the waveforms of respective signals for use in this notification signal generating section 4. In FIG. 3, the abscissa represents the time and the ordinate represents the voltage. Specifically, portions (a) and (b) of FIG. 3 show the waveforms of the detection signal a and the notification signal d (see FIG. 1), respectively. It should be noted that small oscillations representing the shooter's hand tremors are not shown in FIG. 3(a).

Since the shooter has changed the compositions intentionally during the period between the times t1 and t2 for the purpose of panning the camera or panning shot, the detection signal a supplied from the gyrosensor 100 changes as significantly as in FIG. 2.

Since the BPF 205 has cut off the low frequency components, the notification signal d changes steeply as like an impulse in the vicinity of the variation points of the detection signal a (i.e., right after the time t1 or time t2). By using such a notification signal d that changes as like an impulse, the start and end points of a non-tremor movement can be detected.

The notification signal d that has been subjected to this analog signal processing is passed to an ADC 305 in the digital signal processing LSI 300.

Next, the processing performed by the control section 5 will be described with reference to FIG. 1 again.

The notification signal d that has been supplied to the digital signal processing LSI 300 is converted by the ADC 305 into a digital notification signal e, which is then passed to a controller 306.

By reference to the waveform of the notification signal e, the controller 306 detects the start and end points of the non-tremor movement. On sensing the start point of that non-tremor movement, the controller 306 gets a high-speed charge circuit 204 in the analog signal processing LSI 200 controlled by way of an I/O (input/output circuit) 304, thereby resetting the HPF 201 in the analog signal processing LSI 200. Also, the controller 306 turns a switch 307 in the digital signal processing LSI 300 to a fixed input side, thereby fixing the input to the HPF 302. Furthermore, the controller 306 resets the HPF 302 and the integrator 303. On sensing the end point of the non-tremor movement, the controller 306 goes back to the normal processing mode.

Based on the notification signal e, the controller 306 can sense the start and end points of the non-tremor movement by one of the following two methods.

One of those two methods will be described first with reference to FIG. 4.

FIG. 4 is a waveform diagram (1) showing the waveform of a notification signal e. In FIG. 4, the abscissa represents the time and the ordinate represents the voltage (as a digital value). According to this first method, when the notification signal e becomes smaller than a first threshold value −Vs, the start point of the non-tremor movement is detected at a time t3. After that, when the notification signal e becomes greater than a second threshold value Vs, the end point of the non-tremor movement is detected at a time t4.

The other method will be described next with reference to FIG. 5.

FIG. 5 is a waveform diagram (2) showing the waveform of another notification signal e. In FIG. 5, the abscissa represents the time and the ordinate represents the voltage (as a digital value). According to this second method, when the notification signal e becomes smaller than the first threshold value −Vs, the start point of the non-tremor movement is detected at a time t3 just like the first method. Meanwhile, when the notification signal e stays within a predetermined range ±Ve for a certain amount of time te, the end point of the non-tremor movement is detected at a time t5.

The first and second threshold values −Vs and Vs are preferably calculated by multiplying the amplitude of a voltage, produced as the small oscillations representing normal shooter's hand tremors, by a factor of about 2.5 and then adding the product to the magnitude of the variation in zero level voltage. In this preferred embodiment, the variation in zero level voltage is supposed to be 0.025 V, the amplitude of the voltage produced as the small oscillations representing normal shooter's hand tremors is supposed to be 0.25 V, and Vs=0.025+0.25×2.5=0.65 (V).

On the other hand, the predetermined range ±Ve is preferably the sum of the magnitude of the variation in zero level voltage and the amplitude of a voltage produced as the small oscillations representing normal shooter's hand tremors. In this preferred embodiment, the variation in zero level voltage is supposed to be 0.025 V, the amplitude of the voltage produced as the small oscillations representing normal shooter's hand tremors is supposed to be 0.25 V, and Ve=0.025+0.25=0.275 (V). The predetermined amount of time te is preferably determined in view of the property of the BPF 205 to avoid an unwanted situation where a zero-cross of the notification signal e during the shooter's intentional change of compositions causes the motion detector to sense the end of composition change erroneously. In this preferred embodiment, te=60 ms.

According to the first method, the end of the non-tremor movement can be detected more easily. On the other hand, according to the second method, the end of the non-tremor movement can be detected when the movement actually ends.

Hereinafter, the processing to be done by the control section 5 when a non-tremor movement is started will be described with reference to FIG. 6. The start point of the non-tremor movement is detected by the controller 306 based on the notification signal e.

FIG. 6 is a flowchart showing the procedure of the processing to be done when the start of a non-tremor movement is detected.

First, a processing step S601 of resetting an analog HPF will be described with reference to FIG. 6.

On detecting the start of a non-tremor movement by reference to the notification signal e, the controller 306 (see FIG. 1) resets the HPF 201 in the analog signal processing LSI 200. More specifically, the controller 306 sends a control signal Q to the high-speed charge circuit 204 in the analog signal processing LSI 200 by way of the I/O 304, thereby resetting the HPF 201 in the analog signal processing LSI 200.

This analog HPF resetting processing step S601 will be described in further detail with reference to FIG. 7, which is a simplified circuit diagram illustrating the analog HPF resetting processing step S601.

In this preferred embodiment, the HPF 201 includes a capacitor 701 and a resistor 702. The voltage at one terminal of the resistor 702 is fixed at a reference potential level Vref. On the other hand, the high-speed charge circuit 204 for resetting the HPF 201 includes a switch 703 and a resistor 704. The voltage at one terminal of the resistor 704 is also fixed at the same reference potential level Vref.

As used herein, "to reset the HPF 201" means setting the output potential level of the capacitor 701 of the HPF 201 (more specifically, the potential level at one of the two electrodes of the capacitor 701 that is connected to the AMP 202) equal to the reference potential level Vref.

The detection signal a is output from the gyrosensor 100 to the HPF 201 in the analog signal processing LSI 200.

The resistor 704 of the high-speed charge circuit 204 has a sufficiently lower resistance value than the resistor 702. That is why when the switch 703 is closed, the combined resistance value of the HPF 201 and the high-speed charge circuit 204 (i.e., the sum of the resistance values of the resistors 702 and 704) decreases, and therefore, the electrical charge that has been stored in the capacitor 701 can be quickly unloaded from the capacitor 701, or a lacking electrical charge can be rapidly loaded into the capacitor 701. As a result, even if there is a variation in the input signal (i.e., the detection signal a) for the HPF 201, the output potential level of the HPF 201 is always fixed at the reference potential level Vref. The switch 703 is opened and closed in response to the control signal Q supplied from the controller 306.

On detecting the start of a non-tremor movement by reference to the notification signal e, the controller 306 closes the switch 703 in the high-speed charge circuit 204 by sending the control signal Q to the switch 703 by way of the I/O 304. As a result, the input to the AMP 202 is fixed at the reference potential level Vref. Until the end of the non-tremor movement is detected, the controller 306 will keep the switch 703 closed in the high-speed charge circuit 204.

In FIG. 1, a control line is drawn from the high-speed charge circuit 204 to the HPF 201 to clearly indicate the fact that the high-speed charge circuit 204 controls the HPF 201. Actually, however, the high-speed charge circuit 204 is located behind the HPF 201 as shown in FIG. 7. The high-speed charge circuit 204 is then followed by the AMP 202, the output P of which is passed to the LPF 203. When the HPF 201 is reset by the high-speed charge circuit 204, the reference voltage Vref is applied to the AMP 202. Since the AMP 202 also operates on the reference voltage Vref, the output of the AMP 202 also has the reference voltage Vref.

The next processing step S602 of fixing the input to the digital HPF will be described with reference to FIG. 6 again. On finishing the analog HPF resetting processing step S601, the controller 306 (see FIG. 1) performs the digital HPF's input fixing processing step S602. Specifically, the controller 306 sends a control signal R to the switch 307 in the digital signal processing LSI 300 to turn the switch 307 to a fixed potential (i.e., ground potential) side and thereby fix the value of the input voltage for the HPF 302. Until the end of the non-tremor movement is detected, the controller 306 will keep the switch 307 in the digital signal processing LSI 300 connected to the fixed potential side and continue to apply the same voltage to the HPF 302.

The next processing step S603 of resetting the digital HPF as shown in FIG. 6 will be described. On finishing the digital HPF's input fixing processing step S602, the controller 306 performs the digital HPF resetting processing step S603. More specifically, the controller 306 sends a control signal S to the HPF 302, thereby resetting the HPF 302. A digital filter is usually made up of a delay element, an adder and a multiplier. Among these three devices, it is the delay element that functions as a storage device. Thus, to reset the HPF 302 means resetting the storage value of the delay element. It should be noted that as the input to the HPF 302 is fixed at the ground potential level in the previous digital HPF's input fixing processing step S602, the HPF 302 will be reset in a certain amount of time even without performing this digital HPF resetting processing step S603.

Next, the processing step S604 of resetting the integrator as shown in FIG. 6 will be described. On finishing the digital HPF resetting processing step S603, the controller 306 performs the integrator resetting processing step S604. More specifically, the controller 306 sends a control signal T to the integrator 303, and resets the integrator 303. The integrator 303 is also a kind of digital filter and therefore also has a delay element. Thus, the storage value of the delay element in the integrator 303 is reset. To eliminate the blurring perfectly, the time constant of the integrator 303 should be defined to be a long one. For that reason, this integrator resetting processing step S604 needs to be performed in this preferred embodiment.

Hereinafter, the processing to be done by the control section 5 when the end of a non-tremor movement is detected will be described with reference to FIG. 8. The end of the non-tremor movement is detected by the controller 306 by reference to the notification signal e.

FIG. 8 is a flowchart showing the procedure of the processing to be done when the end of the non-tremor movement is detected.

First, a waiting processing step S801 will be described. On detecting the end of the non-tremor movement by reference to the notification signal e, the controller 306 performs the waiting processing step S801 for only a limited amount of time. Specifically, the controller 306 allows a wait of approximately 300 ms before the rest of the processing steps is started.

This waiting processing step S801 needs to be performed because if the influence of the output of the HPF 201 lingered on and after the AMP 202, then the reset that has been done would become meaningless. More specifically, in a situation where the controller 306 performs immediately an analog HPF de-resetting processing step S802 (to be described later) on detecting the end of the non-tremor movement, unless a sufficient quantity of charge had been stored in the capacitor 701 in the HPF 201, the output of the HPF 201 would fluctuate. And its influence would spread and reach the AMP 202 and other circuit sections that follow. If the influence of the output of the HPF 201 lingered on and after the AMP 202 in this manner, the reset that has been done would become meaningless. That is why it is necessary to prevent such influence from spreading and reaching the circuits sections that follow the HPF 201. If this waiting processing step S801 is performed, some delay will be caused in the processing to be done when the end of the non-tremor is detected. However, as long as the delay is as a matter of 300 ms, the optical image stabilization performance and this camera's handiness for the shooter will hardly be affected.

Next, the analog HPF de-resetting processing step S802 will be described. On finishing the waiting processing step S801, the controller 306 performs the analog HPF de-resetting processing step S802. More specifically, the controller 306 sends the control signal Q to the high-speed charge circuit 204 in the analog signal processing LSI 200 by way of the I/O 304, thereby de-resetting the HPF 201 in the analog signal processing LSI 200.

This analog HPF de-resetting processing step S802 will be described in further detail with reference to FIG. 9, which is a flowchart showing the procedure of the analog HPF de-resetting processing step S802.

The controller 306 performs a BPF inverse filtering processing step S901 on the notification signal e. More specifically, the controller 306 performs inverse filtering, which is an opposite type of filtering processing to the one done by the BPF 205, on the notification signal e that was output from the BPF 205, amplified by the AMP 206 and then digitized by the ADC 305.

Before the inverse filtering on the BPF 205 is described, the filter characteristic of the BPF 205 will be described first.

FIG. 10 is a bode diagram showing the characteristic of the BPF 205. In FIG. 10, the abscissa represents the frequency of the input signal and the ordinate represents the gain and the phase. The curve D represents the phase characteristic of the BPF 205 and the curve E represents the gain characteristic of the BPF 205. On the other hand, the curves F and G respectively represent the inverse ones of the phase and gain characteristics of the BPF 205. By performing the BPF inverse filtering processing (S901) represented by the curves F and G on the notification signal e, the output detection signal a of the gyrosensor 100 yet to be input to the BPF 205 can be represented as a digital value.

The notification signal e is generated by subjecting the detection signal a to the band pass filtering using the BPF 205. That is why frequency components in the detection signal a other than those included within the passband are attenuated, and phase information also varies. Strictly speaking, by performing the BPF inverse filtering processing step S901, some frequency components of the output detection signal a of the gyrosensor 100, which are still included in the output signal of the BPF 205, can be reproduced.

It should be noted that the relation between the frequency characteristic (i.e., the pass band) of the BPF 205 shown in FIG. 10 and the respective cutoff frequencies of the HPF 201 and the LPF 203 (see FIG. 1) is preferably defined such that the pass band determined by the HPF 201 and the LPF 203 includes that of the BPF 205.

Next, the signal level confirming processing step S902 will be described with reference to FIG. 9 again. On finishing the BPF inverse filtering processing step S901, the controller 306 performs the signal level confirming processing step S902. More specifically, the controller 306 sees if the signal generated as a result of the BPF inverse filtering processing step S901 has a signal level of 50 mV or less.

If the answer to the query of S902 is NO (i.e., if the amplitude of that signal is greater than 50 mV), then the process goes back to the BPF inverse filtering processing step S901 to perform the BPF inverse filtering processing step S901 and the signal level confirming processing step S902 all over again.

On the other hand, if the answer to the query of S902 is YES (i.e., if the amplitude of that signal is 50 mV or less), then the process advances to the de-resetting processing step S903.

On finishing the amplitude confirming processing step S902, the controller 306 performs the de-resetting processing step S903. More specifically, the controller 306 sends the control signal Q to the high-speed charge circuit 204 by way of the I/O 304, thereby opening the switch 703 in the high-speed charge circuit 204. To close the switch 703 is referred to herein as "resetting processing" and to open the switch 703 during the resetting processing is referred to herein as "de-resetting processing". By performing this de-resetting processing step, the output detection signal a of the gyrosensor 100 is sent to the AMP 202 through the HPF 201.

In the analog HPF de-resetting processing step S802 shown in FIG. 8, the switch 703 in the high-speed charge circuit 204 is opened in the vicinity of the zero-cross point of the output detection signal a of the gyrosensor 100 yet to be input to the BPF 205 (that has a signal level of 50 mV or less). Speaking more strictly, the switch 703 is opened in the vicinity of the zero-cross point of the signal generated as a result of the BPF inverse filtering processing step S901. As a result, the HPF 201 can be de-reset and it is possible to prevent the output of the HPF 201 from fluctuating again.

Next, the digital HPF's input unfixing processing step S803 will be described. On finishing the analog HPF de-resetting processing step S802, the controller 306 performs the digital HPF's input unfixing processing step S803. More specifically, the controller 306 sends the control signal R to the switch 307 in the digital signal processing LSI 300, thereby connecting the switch 307 to the ADC 301. As a result, the output of the ADC 301 is passed to the HPF 302.

The motion detector 1 of this preferred embodiment operates by performing the processing steps described above. Hereinafter, the operation of this motion detector 1 will be summarized with reference to FIG. 11.

FIG. 11 is a waveform diagram showing the waveforms of various signals for use in respective circuit sections of the motion detector 1. In FIG. 11, the abscissa represents the time and the ordinate represents the voltage. More specifically, the waveforms of the detection signal a, the notification signal e, the control signal Q for the high-speed charge circuit 204, the control signal R for the switch 307, the control signal S for the HPF 302, the control signal T for the integrator 303, and the motion signal c are shown in this order from the top.

These waveforms indicate that the shooter changed compositions intentionally for the purpose of panning the camera or panning shot during the period between the times t1 and t2, in which the detection signal a changes significantly. Since the BPF 205 has the function of cutting off low frequency components, the notification signal e changes in an impulse form in the vicinity of the variation points of the detection signal a (i.e., right after the time t1 and just before the time t2). When the notification signal e becomes smaller than the first threshold value −Vs, the start point of the non-tremor movement is detected at a time t3. Meanwhile, when the notification signal e stays within the predetermined range ±Ve for the certain amount of time te, the end point of the non-tremor movement is detected at a time t5.

On detecting the start of the non-tremor movement by reference to the notification signal e, the controller 306 resets the HPF 201 in the analog signal processing LSI 200 at the time t3 (the analog HPF resetting processing step S601). More specifically, the controller 306 sends the control signal Q to the high-speed charge circuit 204 by way of the I/O 304, thereby keeping the switch 703 closed in the high-speed charge circuit 204.

On finishing the analog HPF resetting processing step S601, the controller 306 performs the digital HPF's input fixing processing step S602. Specifically, the controller 306 sends the control signal R to the switch 307 in the digital signal processing LSI 300 to turn the switch 307 to the fixed potential side and thereby fix the value of the input voltage for the HPF 302.

On finishing the digital HPF's input fixing processing step S602, the controller 306 performs the digital HPF resetting processing step S603. More specifically, the controller 306 sends the control signal S to the HPF 302, thereby resetting the HPF 302.

On finishing the digital HPF resetting processing step S603, the controller 306 performs the integrator resetting processing step S604. More specifically, the controller 306 sends the control signal T to the integrator 303, thereby resetting the integrator 303.

On detecting the end of the non-tremor movement by reference to the notification signal e at the time t5, the controller 306 performs the waiting processing step S801 for only a predetermined amount of time. Specifically, the controller 306 allows a wait of approximately 300 ms before the rest of the processing steps is started.

On finishing the waiting processing step S801, the controller 306 performs the analog HPF de-resetting processing step S802. More specifically, the controller 306 sends the control signal Q to the high-speed charge circuit 204 by way of the I/O 304, thereby opening the switch 703 in the high-speed charge circuit 204.

On finishing the analog HPF de-resetting processing step S802, the controller 306 performs the digital HPF's input unfixing processing step S803. More specifically, the controller 306 sends the control signal R to the switch 307 in the digital signal processing LSI 300, thereby connecting the switch 307 to the ADC 301.

Consequently, the motion signal c of the motion detector 1 of this preferred embodiment will never get saturated or never need a significant amount of time to get back to the original state before the time t1 unlike the motion signal c of the conventional motion detector consisting of only the motion detecting section 2 and the motion signal generating section 3 as shown in FIG. 2. Instead, as soon as the wait defined in the waiting processing step S801 passes since the controller 306 detected the end of the non-tremor movement at the time t5 by reference to the notification signal e, the motion signal c can immediately recover its original state before the time t1. And the optical image stabilization mechanism (i.e., an image stabilizer lens or an imager) can also resume its operation from around the center of the image stabilization range.

As described above, according to this preferred embodiment, the controller 306 controls the motion signal generating section 3 so as to fix the motion detection signal at a predetermined level in the interval between the point in time when the start of a non-tremor movement is detected by reference to the notification signal and the point in time when the end of the non-tremor movement is detected. As a result, the blurring can be eliminated almost perfectly without being affected by any disturbances other than the tremor movement produced by the shooter's hand tremors. And no means for extracting DC components from the motion detection signal or no memory to record the history of past DC components is needed anymore.

The motion detector 1 of the preferred embodiment described above is supposed to reset the HPF 201 in the analog signal processing LSI 200 and the HPF 302 and the integrator 303 in the digital signal processing LSI 300 and fix the input to the HPF 302 in the digital signal processing LSI 300. However, not all of these resetting and fixing operations have to be done. The same effect can be achieved by performing at least one of these operations either by itself or in combination.

Embodiment 2

Hereinafter, a preferred embodiment of an image capture device will be described. The image capture device of this preferred embodiment is implemented as a digital still camera, which will be simply referred to herein as a "digital camera".

FIG. 12 is a block diagram illustrating a configuration for a digital camera 500 as a second preferred embodiment. The digital camera 500 performs the function of the motion detector 1 of the first preferred embodiment described above using the gyrosensor 100 and a motion detection processing section 506c.

The motion detection processing section 506c includes the analog signal processing LSI 200 and the digital signal processing LSI 300. The digital camera 500 may operate in the same way as the motion detector 1 of the first preferred embodiment to generate a motion signal c and may eliminate blurring caused by a tremor movement using the motion signal c. Specifically, the digital camera 500 eliminates the blurring caused by the tremor movement by shifting stabilizer lens(es) in the optical system in the opposite direction to compensate the tremor movement sensed by the motion signal c. In the period between a point in time when the start of a non-tremor movement is detected by reference to the notification signal and a point in time when the end of the non-tremor movement is detected, the motion detection processing section 506c operates so as to fix the motion signal at a predetermined level. That is why even if the shooter has changed compositions intentionally for the purpose of panning the camera or panning shot, he or she never feels uncomfortable.

The digital camera 500 shown in FIG. 12 includes the gyrosensor 100, an optical system 501, a CCD 502, an analog front-end (AFE) processor 503, a bus 504, an SDRAM 505, a signal processing LSI 506, an liquid crystal display (LCD) monitor 507, and a shutter-release button 508.

The optical system 501 produces an image of the subject on the CCD 502. The optical system 501 includes a number of lenses including an image stabilizer lens 501a. The image stabilizer lens 501a moves on a plane that intersects with the optical axis 501b at right angles within the optical system 501, thereby compensating the movement of the digital camera 500 produced unintentionally by the shooter's hand tremors.

The CCD 502 is an imager and outputs an image signal representing the subject's image produced. The AFE 503 converts the analog image signal supplied from the CCD 502 into image data as a digital signal, transfers the image data through the bus 504, and then stores it in the SDRAM 505.

The signal processing LSI 506 includes a central processing unit (CPU) 506a, a signal processing section 506b, and the motion detection processing section 506c, which has every function of the motion detector 1 of the first preferred embodiment except that of the gyrosensor 100. Thus, the description of those functions of the motion detection processing section 506c will be omitted herein because they have already been described for the motion detector 1.

The CPU 506a controls the digital camera overall. The signal processing section 506b converts the image data that has been stored in the SDRAM 505 by the AFE 503 into display data qualified to present on the LCD monitor 507 and then outputs the converted data to the LCD monitor 507. When the shutter-release button 508 is pressed halfway, a focus finding operation is started. And when the shutter-release button 508 is pressed down fully, an image shooting operation is performed. If the image data stored in the SDRAM 505 is the image data that has been captured by pressing the shutter-release button 508 fully, the signal processing section 506b converts the image data into recording data and writes the data on a memory card 509. The recording data that has been written on the memory card 509 is then converted by the signal processing section 506b into the display data, which is eventually presented on the LCD monitor 507.

The detection signal is output from the gyrosensor 100 to the motion detection processing section 506c in the signal processing LSI 506. If the shooter has changed compositions intentionally for the purpose of panning the camera or panning shot, the motion detection processing section 506c sends the motion signal c, which is fixed at a predetermined level, to the CPU 506a. It can be said that CPU 506a controls the lens driver 510 substantially not in accordance with the motion signal C because signal level of the motion signal C is fixed.

On the other hand, in a normal state where the composition is not changed, the motion detection processing section 506c generates a motion signal c representing the magnitude of the tremor movement produced by the shooter's hand tremors and sends the signal c to the CPU 506a.

In accordance with the motion signal c, the CPU 506a sends a control signal to the lens driver 510 so as to shift the image stabilizer lens 501a in the opposite direction to compensate the involuntary movement of the digital camera. In other words, CPU 506a moves the optical axis of the image stabilizer lens 501a in accordance with the motion signal c. The motion signal c is used to align the optical axis 501b of the optical system 501 with the optical axis of the CCD 502 (i.e. imager) and maintain that aligned state. Note that the optical axes of the lens and the optical system both moves when the tremor movement occurs.

As clearly understood from the above description, CPU 506a has the first and second control modes. In the first control mode, CPU 506a controls the lens driver 510 to drive a part or all of the optical system in accordance with the motion signal C. In the second control mode, CPU 506a controls the lens driver 510 not in accordance with the motion signal C. It can be said that CPU 506a selects one of the first and second control modes based on the motion signal c and controls the driver section in the selected control mode.

Optionally, the tremor movement produced by the shooter's hand tremors may also be compensated by shifting the CDD 502 (i.e. an imager) within the plane vertical to the optical axis by utilizing the driving circuit instead of driving the image stabilizer lens 501a within the plane vertical to the optical axis. In that case, the motion signal C is used to perform such a control that the image of the subject that has been incident on the CCD from the optical system 501 does not move but stays at a predetermined location on the CCD 502 (which location will be referred to herein as a "default location"). For example, supposing the location at which the subject's image has been incident on the CDD 502 for the first time is the default location, the control is performed using the motion signal c such that the subject's image continues to be projected onto the same default location.

The same statement also applies to the third and fourth preferred embodiments to be described below as long as the image stabilizer lens and/or a movable CCD is/are used.

Embodiment 3

Hereinafter, a preferred embodiment of a lens with an optical image stabilization (OIS) function according to the present invention will be described. The lens of this preferred embodiment is an interchangeable lens for use in a camera, of which the lens is replaceable with the interchangeable lens.

FIG. 13 is a schematic representation illustrating an interchangeable lens 600 as a third preferred embodiment. The interchangeable lens 600 has the same function as the motion detector 1 of the first preferred embodiment described above. That is to say, the interchangeable lens 600 may generate the motion signal c by operating in exactly the same way as the motion detector 1 of the first preferred embodiment and may eliminate blurring, caused by a tremor movement, using the motion signal c. Specifically, the interchangeable lens 600 eliminates the blurring caused by the tremor movement by shifting the image stabilizer lens(es) in the optical system in the opposite direction to compensate the tremor movement sensed by the motion signal c.

In the period between a point in time when the start of a non-tremor movement is detected by reference to the notification signal and a point in time when the end of the non-tremor movement is detected, the signal processing LSI 506 operates so as to fix the motion signal at a predetermined level. That is why even if the shooter has changed compositions intentionally for the purpose of panning the camera or panning shot, he or she never feels uncomfortable.

The interchangeable lens 600 shown in FIG. 13 includes a gyrosensor 100, a signal processing LSI 506, a lens driver 510, an objective lens 601, a zoom lens 602, a diaphragm 603, an image stabilizer lens 501a, and a focus lens 604. The signal processing LSI 506 is identical with the counterpart (also identified by the same reference numeral 506 and) included in the digital camera 500 of the second preferred embodiment described above. This interchangeable lens 600 compensates the tremor movement just as already described for the second preferred embodiment and the description thereof will be omitted herein.

Embodiment 4

Hereinafter, a camera system will be described as a fourth preferred embodiment.

FIG. 14 is a schematic representation illustrating a camera system as the fourth preferred embodiment. The camera system of this preferred embodiment includes a camera body 700 and an interchangeable lens 800.

The camera system shifts either the image stabilizer lens (es) in the optical system of the interchangeable lens 800 or the imager in the camera body in such a direction that compensates a tremor movement sensed by the motion signal. As a result, the blurring caused by the tremor movement can be eliminated.

The interchangeable lens 800 includes an objective lens 601, a zoom lens 602, a diaphragm 603, an image stabilizer lens 501a, and a focus lens 604. A communication section (1) 605 not only transmits the motion signal, supplied from a gyrosensor 100, to the camera body 700 but also passes a control signal, received from the camera body 700, to a lens driver 510.

Compared to the lens of the third preferred embodiment with the optical image stabilization function, the interchangeable lens 800 includes the communication section (1) 605 as an additional component but has no signal processing LSI, because a signal processing LSI is included in the camera body 700. The communication section (1) 605 is provided to enable the interchangeable lens 800 to communicate with the camera body 700.

The camera body 700 includes a communication section (2) 701, a signal processing LSI 702, and a CCD 502. The other shooting-related components will not be described herein. The communication section (2) not only passes the motion signal, received from the interchangeable lens 800, to the signal processing LSI 702 but also transmits a control signal, supplied from the signal processing LSI 702, to the interchangeable lens 800. The signal processing LSI 702 includes a motion signal acquiring section (not shown) to receive the motion signal that has been transmitted from the interchangeable lens 800 by way of the communication section (2) 701 and a motion detecting section (not shown, either) including another motion detector according to the present invention in addition to the gyrosensor 100 that also functions as a motion detector according to the present invention. This camera system as the preferred embodiment operates just like the image capture device of the second preferred embodiment described above except that the signals are exchanged via the communication sections (1) 605 and (2) 701, and the description thereof will be omitted herein. Optionally, the tremor movement may also be compensated by shifting the CDD 502 (i.e. an imager) within the plane vertical to the optical axis instead of driving the image stabilizer lens 501a within the plane vertical to the optical axis.

According to the present invention, blurring caused by a tremor movement can be eliminated almost perfectly without being affected by any disturbances other than the tremor movement produced by a shooter's hand tremors. Thus, the present invention is effectively applicable for use in various types of image capture devices such as digital cameras, digital camcorders, and cellphones with a camera, camera systems that use an interchangeable lens, interchangeable lenses and camera bodies.

What is claimed is:

1. A motion detector comprising:
    a motion detecting section for detecting a movement of an image capture device and outputting a detection signal, of which the amplitude and frequency represent the movement;
    a motion signal generating section for generating a motion signal representing a physical quantity corresponding to the magnitude of the movement based on the detection signal;
    a notification signal generating section for generating a notification signal that marks start and end of a movement of the image capture device, which is a non-tremor movement, based on the detection signal that has been output; and
    a control section for controlling the motion signal generating section by reference to the notification signal such that an output level of the motion signal is fixed at a predetermined one from the start through the end of the non-tremor movement.

2. The motion detector of claim 1, wherein the motion signal generating section includes an analog circuit and a digital circuit.

3. The motion detector of claim 2, wherein the digital circuit of the motion signal generating section includes an integrator, and
    wherein the integrator integrates the detection signal that has been processed by the analog and digital circuits, thereby generating the motion signal representing the physical quantity corresponding to the magnitude of the movement.

4. The motion detector of claim 3, wherein the notification signal generating section detects, as a variation point of the notification signal, a point where a waveform of the notification signal changes in an impulse form.

5. The motion detector of claim 4, wherein the control section stores first and second threshold values that have been defined in advance, and
    wherein when the notification signal passes through the first threshold value, the control section senses that the non-tremor movement has started, and wherein when the notification signal passes through the second threshold value after the start of the non-tremor movement has been sensed, the control section senses that the non-tremor movement has ended.

6. The motion detector of claim 4, wherein the control section stores a predefined threshold value, and
wherein when the notification signal passes through the threshold value, the control section senses that the non-tremor movement has started, and
wherein when the notification signal stays within a predetermined amplitude range for a predetermined amount of time, the control section senses that the non-tremor movement has ended.

7. The motion detector of claim 4, wherein the control section controls the motion signal generating section so as to fix the detection signal at a predetermined level before the motion signal generating section integrates the detection signal.

8. The motion detector of claim 7, wherein the control section controls the motion signal generating section such that the analog circuit of the motion signal generating section fix the detection signal at the predetermined level.

9. The motion detector of claim 7, wherein the control section controls the motion signal generating section such that the digital circuit of the motion signal generating section fix the detection signal at the predetermined level.

10. The motion detector of claim 7, wherein the control section controls the motion signal generating section such that both the analog and digital circuits of the motion signal generating section fix the detection signal at the predetermined level.

11. The motion detector of claim 1, wherein the control section controls the motion signal generating section such that the detection signal is unfixed from the predetermined level in the vicinity of a zero-cross point of the detection signal.

12. The motion detector of claim 1, wherein the notification signal generating section generates the notification signal that marks the start and end of the non-tremor movement of the image capture device based on frequency of the detection signal.

13. An image capture device comprising an imager and an optical system to form an image of a subject, the device further comprising:
a motion detecting section for detecting a movement of the image capture device and outputting a detection signal, of which the amplitude and frequency represent the movement;
a motion signal generating section for generating a motion signal representing a physical quantity corresponding to the magnitude of the movement based on the detection signal;
a notification signal generating section for generating a notification signal that marks start and end of a movement of the image capture device, which is a non-tremor movement, based on the detection signal that has been output; and
a control section for controlling the motion signal generating section by reference to the notification signal such that an output level of the motion signal is fixed at a predetermined one from the start through the end of the non-tremor movement.

14. The image capture device of claim 13, wherein the optical system includes an image stabilizer lens, of which the positions are changed in response to a drive signal, and
wherein the image capture device further includes a lens driver that shifts the image stabilizer lens in response to the motion signal, and
wherein the lens driver shifts an optical axis of the image stabilizer lens such that an optical axis of the optical system is aligned, and then kept aligned, with that of the imager in accordance with the motion signal.

15. The image capture device of claim 13, further comprising a driver for shifting the imager in response to the motion signal,
wherein the driver shifts the imager in response to the motion signal such that the image of the subject that has been incident on the imager from the optical system does not move but stays at a predetermined location on the imager.

16. An image capture device with an imager comprising:
an optical system to form an image of a subject by collecting light from the subject;
a driver for driving a part or all of the optical system within a plane that is perpendicular to an optical axis of the optical system;
a motion detecting section for detecting a movement of the image capture device and outputting a motion signal representing a detection result; and
a processor for stabilizing the image of the subject due to the movement of the image capture device, having:
a first control mode for controlling, based on the motion signal that has been output, the driver which drives a part or all of the optical system; and
a second control mode for controlling the driver not based on the motion signal,
wherein the processor selects one of the first control mode and second control mode by reference to the motion signal and controls the driver in the selected control mode.

17. An image capture device having an optical system to form an image of a subject by collecting light from the subject and an imager for imaging the image of the subject,
the device comprising:
a driver for driving the imager within a plane that is perpendicular to an optical axis of the optical system;
a motion detecting section for detecting a movement of the image capture device and outputting a motion signal representing a detection result; and
a processor for stabilizing the image of the subject due to the movement of the image capture device, having:
a first control mode for controlling, based on the motion signal that has been output, the driver which drives the imager; and
a second control mode for controlling the driver not based on the motion signal,
wherein the processor selects one of the first control mode and second control mode by reference to the motion signal and controls the driver in the selected control mode.

18. An interchangeable lens for use in an image capture device, of which the lens is replaceable with the interchangeable lens,
the interchangeable lens comprising:
an optical system to form an image of a subject;
a motion detecting section for detecting a movement of the interchangeable lens and outputting a detection signal, of which the amplitude and frequency represent the movement;

a motion signal generating section for generating a motion signal representing a physical quantity corresponding to the magnitude of the movement based on the detection signal;

a notification signal generating section for generating a notification signal that marks start and end of a movement of the interchangeable lens, which is a non-tremor movement, based on the detection signal that has been output; and a control section for controlling the motion signal generating section by reference to the notification signal such that an output level of the motion signal is fixed at a predetermined one from the start through the end of the non-tremor movement.

19. A camera system comprising an interchangeable lens and a camera body, wherein the interchangeable lens includes:

a motion detecting section for detecting a movement of the interchangeable lens and outputting a detection signal, of which the amplitude and frequency represent the movement; and a first communication section, and wherein the camera body includes:

a second communication section to be connected to the first communication section; and a signal processor for receiving a detection signal through the first and second communication sections and generating a motion signal representing a physical quantity corresponding to the magnitude of the movement based on the detection signal, and wherein the signal processor includes:

a notification signal generating section for generating a notification signal that marks start and end of a movement of the camera body, which is a non-tremor, based on the frequency of the detection signal; and a control section for controlling the motion signal generating section by reference to the notification signal such that an output level of the motion signal is fixed at a predetermined one from the start through the end of the non-tremor movement.

* * * * *

UNITED STATES PATENT AND TRADEMARK OFFICE
CERTIFICATE OF CORRECTION

PATENT NO. : 7,973,820 B2  
APPLICATION NO. : 12/121142  
DATED : July 5, 2011  
INVENTOR(S) : Masamichi Ohara, Yosuke Yamane and Yoshiyuki Kishimoto Page 1 of 1

It is certified that error appears in the above-identified patent and that said Letters Patent is hereby corrected as shown below:

Column 19, lines 23 and 27, change "fix" to -- fixes --.

Signed and Sealed this  
Twenty-second Day of November, 2011

David J. Kappos  
*Director of the United States Patent and Trademark Office*